Figure 1:
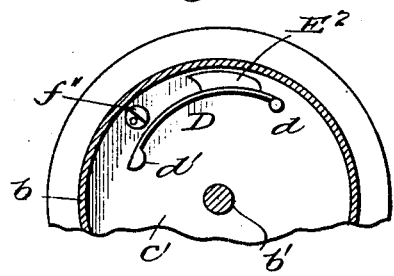

No. 871,167. PATENTED NOV. 19, 1907.
E. L. GILMORE.
FISHING REEL.
APPLICATION FILED SEPT. 28, 1906.

2 SHEETS—SHEET 1.

Witnesses
T. L. McClane
James F. Crown

Inventor
E. L. Gilmore
By E. B. Clark
Attorney

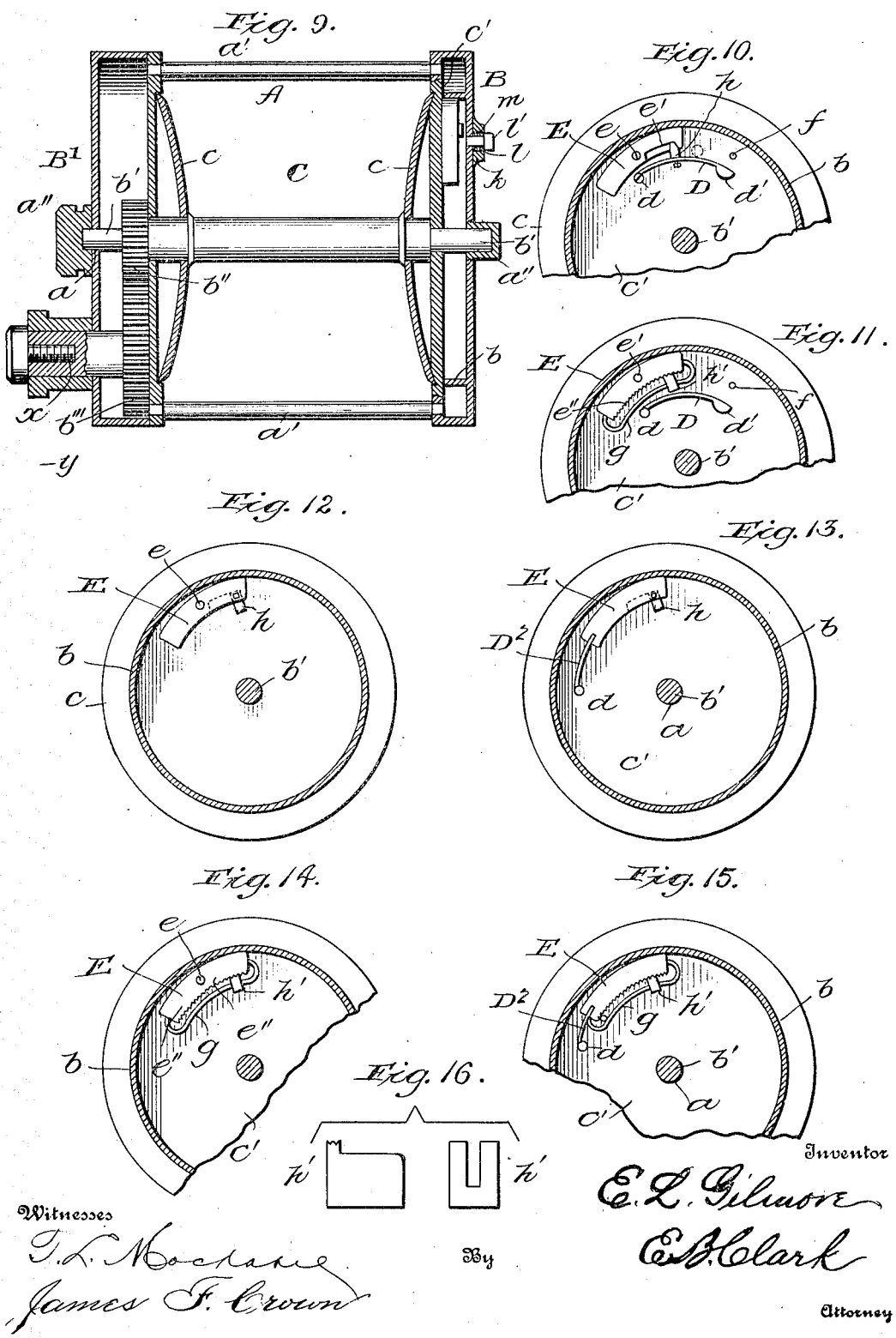

UNITED STATES PATENT OFFICE.

EDWARD L. GILMORE, OF YOUNGSTOWN, OHIO, ASSIGNOR OF ONE-HALF TO DAVID F. ANDERSON, OF YOUNGSTOWN, OHIO.

FISHING-REEL.

No. 871,167.  Specification of Letters Patent.  Patented Nov. 19, 1907.

Application filed September 28, 1906. Serial No. 336,549.

*To all whom it may concern:*

Be it known that I, EDWARD L. GILMORE, a citizen of the United States, residing at Youngstown, in the county of Mahoning and State of Ohio, have invented certain new and useful Improvements in Fishing-Reels, of which the following is a specification.

This invention relates to fishing reels, and more particularly to an automatic, adjustable drag or brake therefor.

The object of my invention is to provide in a fishing reel an automatic, centrifugal brake device capable of adjustment and limitation, and applied to the end of a line-spool, adapted to operate in conjunction with a fixed rim, or equivalent means, on the reel casing, to regulate or control the speed of rotation of the spool, thereby preventing snarling or back-lashing of the line on the spool.

Another object is to provide an automatic brake device of simple construction, capable of quick adjustment to suit different weights of line or bait, size of line-spool, different kinds of rods and other varying conditions apt to arise or be present in fishing tackle.

By limiting the outward movement of the spring brake-lever, thereby controlling or stopping the centrifugal pressure at any desired degree, no matter what the speed of the spool may be, the brake cannot exert a pressure beyond that point or degree. This is necessary that the brake may not unduly retard the rotation of the spool during first period of cast, and yet give sufficient pressure at finish.

The matter constituting my invention will be defined in the claims.

I will now describe the details of construction of my improved brake devices by reference to the accompanying drawings, in which,—

Figures 1 to 8 are views of modified forms of my invention, each showing an end of a line spool to which a centrifugally operated brake is applied and a section of a fixed rim of the casing. Fig. 9 represents a longitudinal section of a fishing reel, partly showing my brake device. Fig. 10 represents part of an end view of a reel spool with parts in section, showing another form of my centrifugally actuated brake. Fig. 11 represents a similar view, showing a slight modification. Figs. 12, 13, 14, and 15 represent end views of a reel-spool with modified forms of my centrifugal brake applied thereto, and a section of a fixed rim or flange on the reel casing. Fig. 16 represents side and end views, on enlarged scale, of an adjustable weight device for the brake-shoe.

In bait casting the bait is delivered with varying degrees of velocity, in the direction desired, by swinging the pole through the air, the tip and bait extending a few inches beyond, describing an arc, and the bait being restrained from flight until such time as it is desired to release it by pressure of thumb on the spooled line. When released it is projected by centrifugal force or potential energy to some distance, when it is recovered by operating the reel in the ordinary manner.

In casting the impetus given to the line-spool upon release of bait is often sufficient to cause the spool to pay out line faster than the bait travels, causing back-lashing. The means heretofore employed to prevent the same by regulating speed of line spool was by snubbing or checking spool, by pressing the thumb against same, an operation demanding great skill to do successfully, and almost impossible to learn, and never acquired with that degree of perfection but what back-lashing would frequently occur under conditions of actual fishing, when endeavoring to cast the bait with accuracy at different distances.

The bait has a graduated speed through the air from fast to slow, but the impetus given to the line-spool does not lose its speed in the same ratio or time, so it has to be restrained by the application of a graduated pressure, for best results. A uniform or fixed pressure, such as would be given by a set-drag, such as reels are ordinarily provided with, will not do. As different speeds are given to the reel in the endeavor to cast different distances, the brake or pressure must be so applied in restraining the speed of the reel that it may give out the line as fast as the bait will take it, and no faster. Heretofore this has been done with varying degrees of success by the pressure of the thumb on the spool.

The basic principles and simplest forms of my centrifugal brake are illustrated in Figs. 1 to 8 inclusive and will be described in detail after a description of the reel frame, line spool and connections.

The reel A is constructed with the usual frame composed of the heads B and B¹ connected by rods $a'$ and having a central shaft or axle $b'$ passing through openings $a$ in the heads and journaled in the end bearings $a''$. In the head $B^1$ is arranged the gearing, composed of a pinion $b''$ on shaft $b'$ and meshing with a driving gear $b'''$, on a short shaft $x$, adapted to be operated by a suitable handle, (not shown). The line spool C is composed of the concave end plates $c$ $c$ secured to the shaft $b'$. To one end of the shaft $b'$ is secured a flat end plate $c'$, which may also be rigidly connected to the concave plate $c$ so as to revolve therewith. On this flat plate $c'$ is mounted my centrifugal brake device. On the fixed head B of the reel-frame is rigidly secured an inwardly projecting annular ring or flange $b$ which serves as the brake-rim or bearing for my centrifugal spring-brake as shown in Fig. 9 and the other figures of the drawings. The spring brake D may be provided with a brake shoe $E^2$, as shown in Fig. 1. In this form of brake I provide an adjustable eccentric stop device $f''$ which may be turned toward or from the brake D for controlling the extent of its outward movement.

Figure 2:
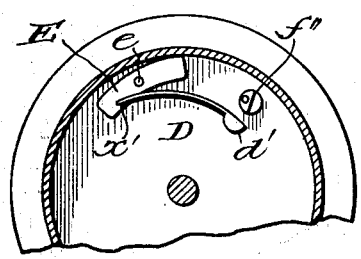

A favorite and effective form of my brake device is illustrated in Fig. 2 in which there is a perfectly balanced brake shoe E having the spring brake lever D attached thereto and having a weighted end $d'$ which is controlled by an adjustable eccentric stop $f''$. This eccentric stop serves to limit the outward movement of the spring brake lever D. The weight $d'$ may be applied in any desired manner to the lever D and may be an integral part thereof formed by tapering the stem of the lever. In this design the pull of lever D is in line of the brake pivot and the only force applied to the brake is that carried through the action of the spring lever. By attaching the lever D at $x'$, I get a direct centrifugal pull or pressure in addition to the above described action. Suitable means, such as a plunger $l$, may be employed to adjust the stop $f''$ and also the adjustable members $h$ and $h'$. This result is effected by reason of the fact that the adjustable members are carried by the end of the spool and which latter is movable circumferentially about its axis relative to the frame which bears the said plunger. On depression of the plunger its inner end will assume a position in the path of the member to be adjusted when the spool and said member are rotated slightly by the operator to cause the desired adjustment of the part. Upon release of the plunger, its spring throws it out of the path of the spool members.

Figure 3:
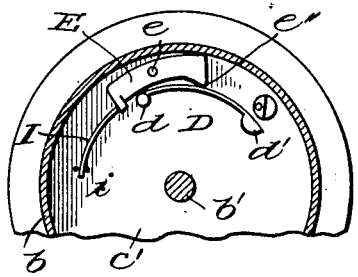

In the modification shown in Fig. 3 the construction and operation is very similar to that shown in Fig. 2, but in this arrangement the spring lever D is attached separately to the post $d$ adjacent to the brake shoe E and bears against an inwardly projecting lug $e''$ of the brake shoe E and is controlled at its outer end by the eccentric stop $f''$. The brake shoe E is pivotally connected to the plate $c'$ by a central pin $e$, in position to bear upon the fixed rim $b$. The brake shoe E may be steadied and lightly held in place by a thin spring I attached to its rear end and held at its outer end between two pins $i$.

Figure 4:
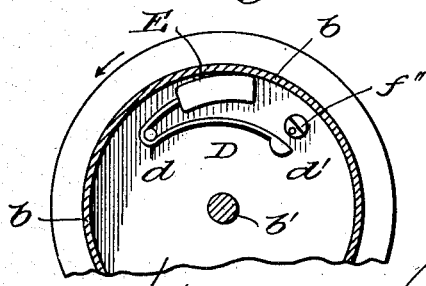

The device may be further modified as shown in Fig. 4, in which the spring lever D is bent and pivoted to the pin $d$ and its short arm connected to the brake shoe E. In this modification an adjustable eccentric stop $f''$ is set in the end plate $c'$ so as to limit the movement of the weighted end $d'$ of lever D.

Figure 5:
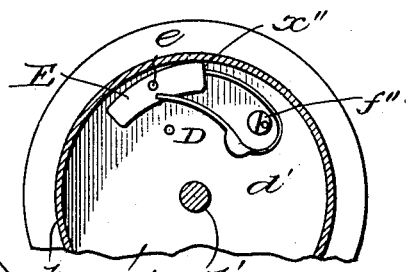

The device may be further modified as shown in Fig. 5, in which one end of the brake-lever D is attached to the pivotal pin $e$ of shoe E, while the other end bears against the end of the brake-shoe at $x''$. In this construction, the weight $d'$ of lever D will be limited in its outward movement by the adjustable eccentric stop $f''$.

Figure 6:
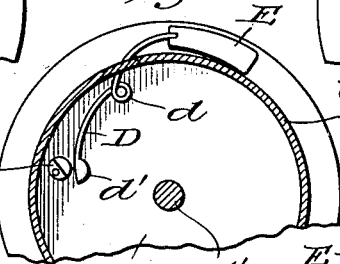

The brake-shoe E may be arranged to bear upon the outer surface of the rim $b$, as shown in Fig. 6, and in this arrangement, the lever D is made longer and coiled upon itself around the pivotal pin $d$, while the weighted end $d'$ is arranged to bear against the adjustable stop $f''$.

Figure 7:
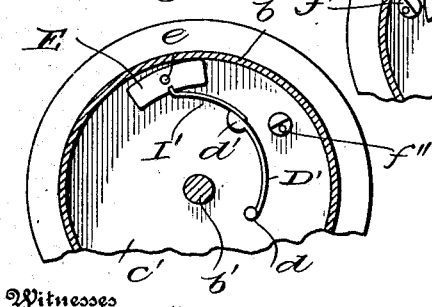
Figure 8:
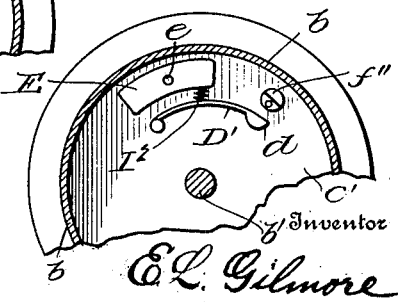

A mechanical equivalent for the spring-lever D could be made by using a comparatively heavy wire or stiff lever $D^1$, pivoted at $d$ and having a weighted end $d'$, as shown in Fig. 7. In this device, a spring $I^1$ is attached to the brake-shoe E, near its pivotal pin $e$. It will be seen that the brake $D^1$ bears against the outer end of the spring $I^1$ and its outward movement is controlled by the eccentric stop device $f''$, as above described with reference to other figures of the drawing. Instead of a flat spring $I^1$, I may use in this device a coiled spring $I^2$ placed against the inner face of the brake-shoe and bearing on the stiff lever $D^1$, as shown in Fig. 8.

In the modification shown in Fig. 10, I provide a sliding and adjustable weight or fulcrum $h$, arranged in a slot or on a bar at the inner face of brake-shoe E, in position for spring-lever D to bear against, as shown. Lever D is pivoted to post $d$, placed near the shoe E, and has a weighted end $d'$, adapted to be limited in outward movement by the fixed stop $f$. By changing the position of the weight or fulcrum $h$, I regulate the lever action upon the brake-shoe E and the outward movement of lever D is limited by the stop $f$.

The construction of the device shown in Fig. 11 is very similar to that in Fig. 10, but is modified by application of a fine curved rod or bar $g$ to the opposite ends of the shoe E. To this curved bar is applied an adjustable weight $h'$ having teeth at its inner face engaging teeth $e''$ on the inner face of shoe E. This adjustable weight $h'$ is shown on enlarged scale in Fig. 16. Evidently the weight or fulcrum $h'$ may be slid to any desired position on bar $g$ and will engage the teeth $e''$ and be held in place.

In Fig. 12 is shown a simpler form of an adjustable weight $h$, by means of which it is possible to change the brake-power of the shoe E. The weight $h$ may be held in a slot or in any other desired manner for connecting it with the shoe E. In the modification shown in Fig. 13, the same adjustable weight $h$ is applied to shoe E, but the shoe, instead of being pivoted by pin $e$ has attached at its rear end a spring $D^2$ which is connected to a post $d$ in the end plate $c'$. Fig. 14 shows substantially the same construction of brake-shoe E, with teeth $e''$, and bar $g$ and a toothed adjustable weight $h'$, as shown in Fig. 11.

Fig. 15 shows a slight modification of the device shown in Fig. 14 and includes a spring bar $D^2$ fixed to a post $d$ in the end plate $c'$. The fulcrum $h$ or sliding weight $h'$ can be adjusted, that is slid to the right or left along the edge of the brake, by means of a plunger $l$ set in an opening in a raised disk $k$ on the fixed head B of the reel-case. A coiled spring $m$ is preferably placed between the plate B and head $l'$ of the plunger for retracting the latter. The plunger $l$ is arranged in head plate B in position to be in line of a circle which would be described by fulcrum $h$ and weight $h'$ when rotated with plate $c'$ to which the brake devices are attached. When the plunger is depressed its inner end may be made to engage the fulcrum or weight when one or the other is rotated into position. Now, by firmly turning the line-spool C, the fulcrum may be moved to right or left, depending on the direction in which the spool is rotated and by thus changing the fulcrum, any desired pressure upon the brake rim may be obtained.

Having described my invention, what I claim, and desire to secure by Letters Patent, is,—

1. In a fishing reel comprising a frame and rotatable spool mounted therein, the combination of a brake member carried by the spool for coöperation with the frame, and a plunger applied to the frame and operable to engage with and disengage from the brake member to control the operation of the latter.

2. In a fishing reel, the combination with the spool, of a centrifugally operable brake for said spool, and means for controlling the centrifugal action of the brake.

3. In a fishing reel, the combination with the spool, of a centrifugally operable brake for said spool, and means applied to the reel for varying at will the centrifugal action of the brake.

4. In a fishing reel, the combination with the spool, of a centrifugally operable brake for said spool, and manually operable means co-acting with the brake for varying the centrifugal braking action thereof.

5. In a fishing reel, the combination with the spool, of a brake for retarding the movement of said spool and manually controlled means for varying the pressure of said brake.

6. In a fishing reel, the combination with the spool, of a centrifugally operable brake for retarding the movement of the spool, and stop means arranged to coöperate with the brake to govern the centrifugal action thereof.

7. In a fishing reel, the combination with the spool, of a centrifugally operating brake for automatically retarding the movement of the spool, and means independent of the spool for governing the action of said centrifugally operating brake.

8. In a fishing reel, the combination with the spool, a brake element for retarding the movement of the spool, and means capable of adjusting the braking action of said brake.

9. In a fishing reel, the combination with the spool, a brake flange adjacent thereto, a brake which is mounted on the spool for coöperation with the brake flange, and means capable of varying the braking action of the brake member with respect to the brake flange aforesaid.

10. In a fishing reel, the combination with the spool, an automatically operating brake for retarding the movement of the spool, and external manually operable means for controlling the braking action of said brake.

In testimony whereof I affix my signature in presence of two witnesses.

EDWARD L. GILMORE.

Witnesses:
A. W. CRAVER,
H. G. HUFFMAN.